United States Patent
Mastro et al.

(10) Patent No.: US 10,161,408 B2
(45) Date of Patent: Dec. 25, 2018

(54) MANHATTAN DUAL FDGS AUX PUMP DESIGN

(71) Applicant: United Technologies Corporation, Hartford, CT (US)

(72) Inventors: Jacob Peter Mastro, Glastonbury, CT (US); Michael E. McCune, Colchester, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 842 days.

(21) Appl. No.: 14/927,108

(22) Filed: Oct. 29, 2015

(65) Prior Publication Data
US 2017/0122330 A1    May 4, 2017

(51) Int. Cl.
| | |
|---|---|
| F04D 29/06 | (2006.01) |
| B64D 27/16 | (2006.01) |
| F04D 29/053 | (2006.01) |
| F02K 3/04 | (2006.01) |
| F04D 25/04 | (2006.01) |
| F04D 29/32 | (2006.01) |
| F01D 25/20 | (2006.01) |
| F02C 7/32 | (2006.01) |
| F01D 21/04 | (2006.01) |
| F16H 57/04 | (2010.01) |

(52) U.S. Cl.
CPC ........... *F04D 29/061* (2013.01); *B64D 27/16* (2013.01); *F01D 25/20* (2013.01); *F02C 7/32* (2013.01); *F02K 3/04* (2013.01); *F04D 25/045* (2013.01); *F04D 29/053* (2013.01); *F04D 29/325* (2013.01); *F01D 21/045* (2013.01); *F05D 2220/323* (2013.01); *F05D 2220/36* (2013.01); *F16H 57/04* (2013.01); *F16H 57/0436* (2013.01); *F16H 57/0471* (2013.01)

(58) Field of Classification Search
CPC .... F04D 25/045; F04D 29/043; F04D 29/053; F04D 29/06; F04D 29/061; F04D 29/063; F04D 29/325; F02K 3/04; B64D 27/16; F05D 2220/323; F05D 2260/98; F16H 57/04; F16H 57/0436; F16H 57/0471; F01D 25/18; F01D 25/20; F05B 2260/98
See application file for complete search history.

(56) References Cited

U.S. PATENT DOCUMENTS

| | | | |
|---|---|---|---|
| 8,702,373 B1 * | 4/2014 | Valva | F01D 25/20 415/111 |
| 2015/0292359 A1 * | 10/2015 | Ketchum | F01D 21/00 415/1 |

FOREIGN PATENT DOCUMENTS

WO    WO 2015060912 A2 *  4/2015  ............. F01D 25/20

* cited by examiner

*Primary Examiner* — Richard A Edgar
*Assistant Examiner* — Alexander A White

(57) ABSTRACT

What is described is a system for pumping lubricant to a component of a gas turbine engine. The system includes a fan gear coupled to a fan shaft of the gas turbine engine and configured to rotate in a forward direction and in a reverse direction based at least partially on a direction of wind relative to a fan of the gas turbine engine. The system also includes a first pump coupled to the fan gear and configured to pump lubricant to the component in response to the fan rotating in the forward direction. The system also includes a second pump coupled to the fan gear and configured to pump lubricant to the component in response to the fan rotating in the reverse direction.

20 Claims, 5 Drawing Sheets

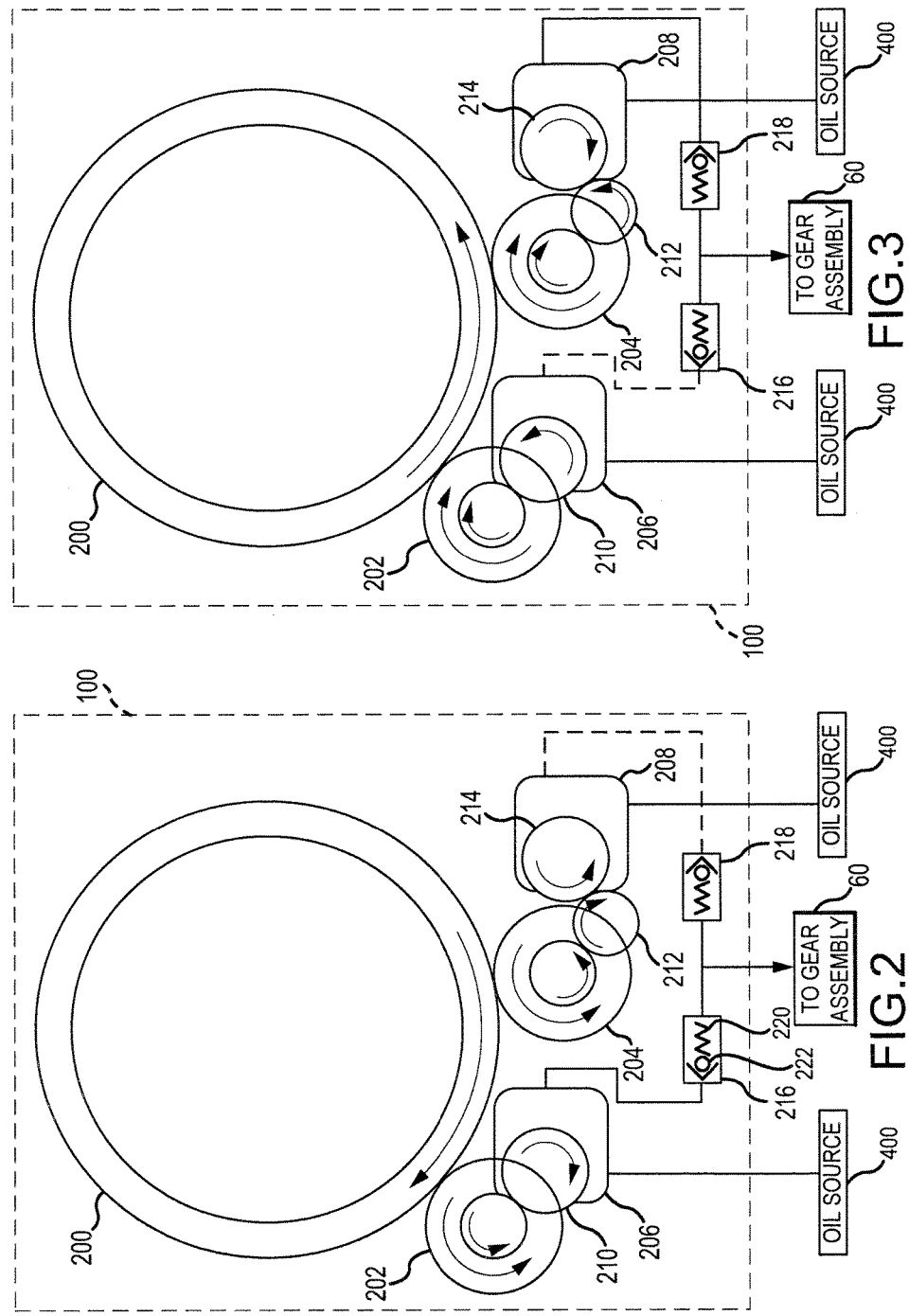

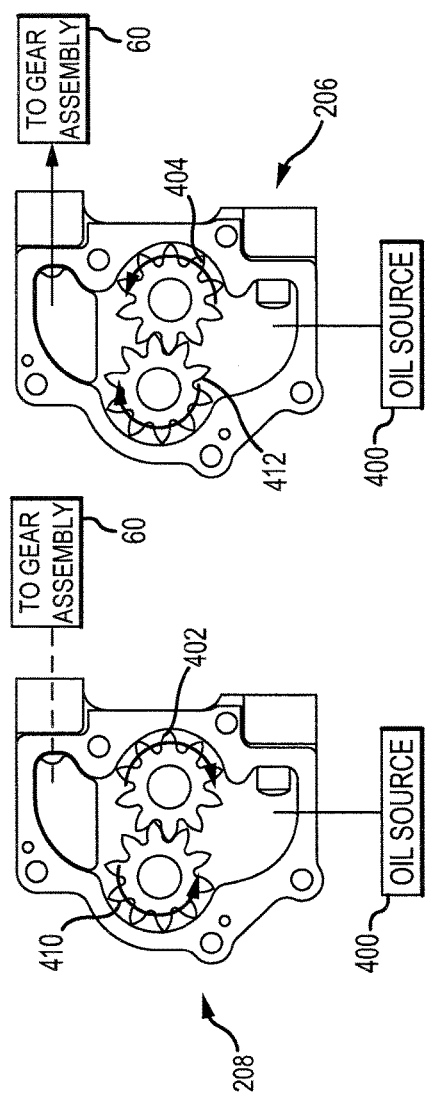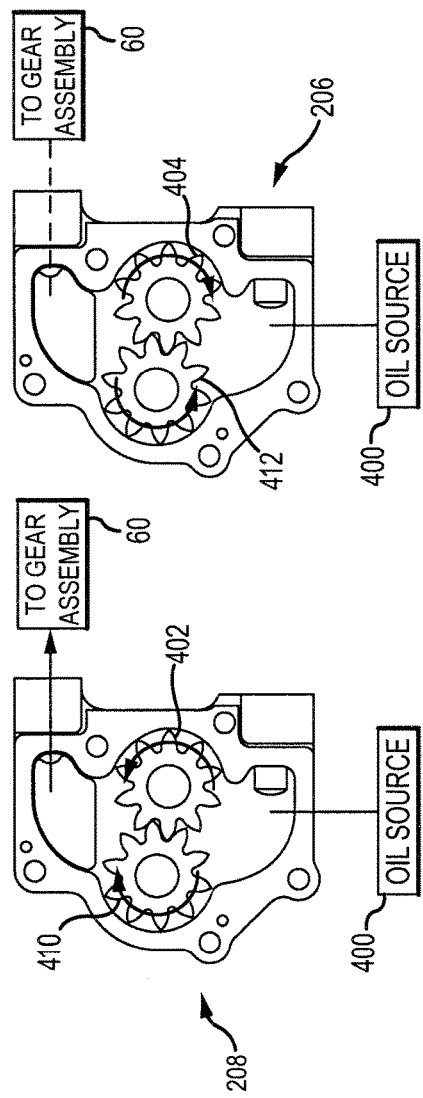

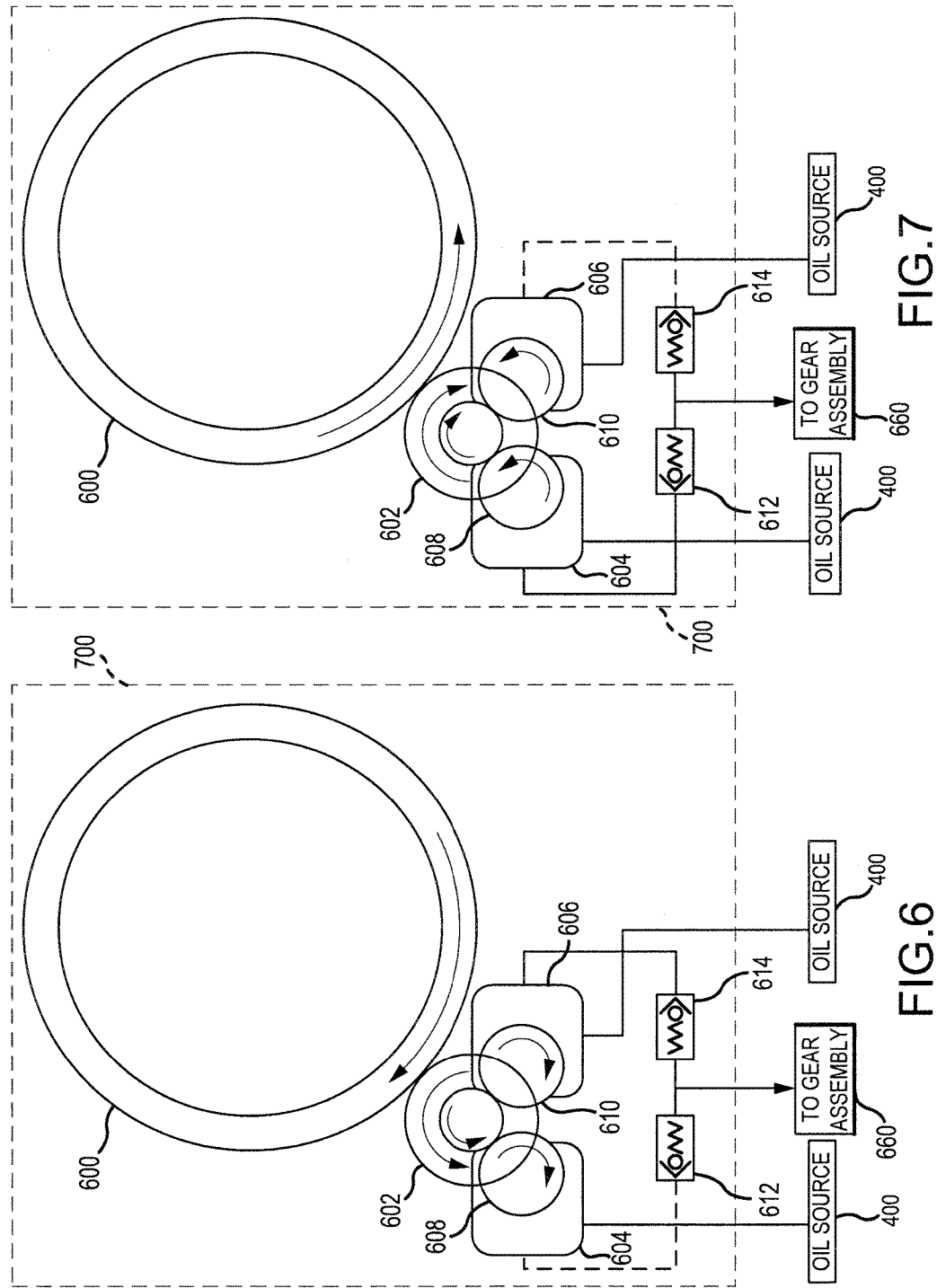

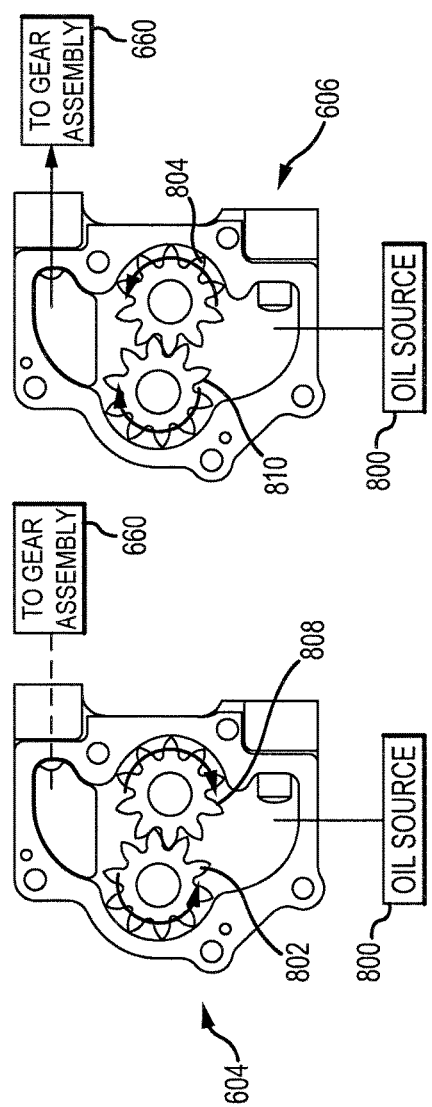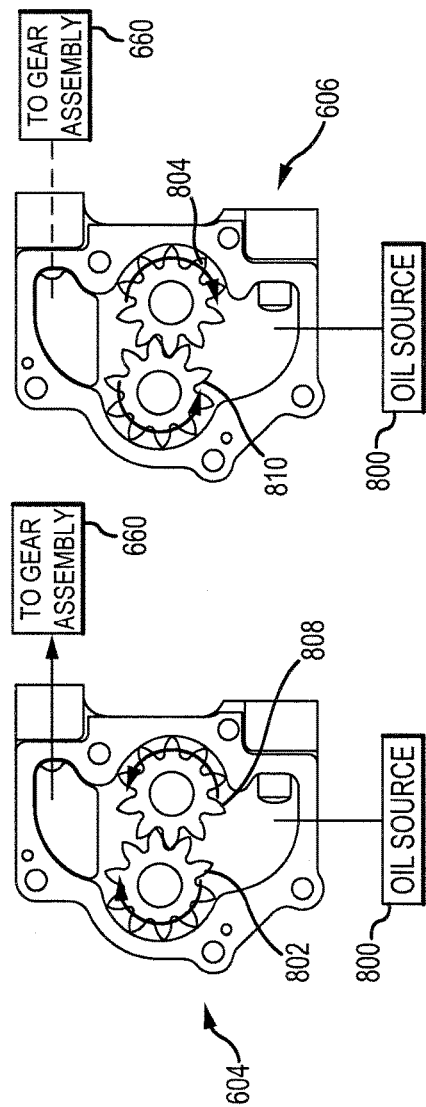

MANHATTAN DUAL FDGS AUX PUMP DESIGN

FIELD

The present disclosure relates generally to lubrication systems for aircraft and, more particularly, to a windmill pump design including gears for pumping oil to a gear assembly in response to rotation of an aircraft fan in either direction.

BACKGROUND

Gas turbine engines typically include a fan section, a compressor section, a combustor section and a turbine section. A gear system may receive torque from the turbine section at a given angular velocity, change the angular velocity and deliver torque to the fan section at a different angular velocity than the angular velocity received at the turbine section. The gear system may include bearings, such as journal bearings, which may function advantageously when lubricated. Some gas turbine engines include a pump coupled to the fan section. The pump may draw lubricant from a source and pump the lubricant to the journal bearings. However, in response to the gas turbine engine being in an off state and facing downwind, the fan section may rotate in a reverse direction, causing the pump to draw lubricant from the journal bearings.

SUMMARY

What is described is a system for pumping lubricant to a component of a gas turbine engine. The system includes a fan gear coupled to a fan shaft of the gas turbine engine and configured to rotate in a forward direction and in a reverse direction. The system also includes a first pump coupled to the fan gear and configured to pump lubricant to the component in response to the fan rotating in the forward direction. The system also includes a second pump coupled to the fan gear and configured to pump lubricant to the component in response to the fan rotating in the reverse direction.

The foregoing system may also include a first idler gear directly connected to the fan gear and coupled to the first pump and a second idler gear directly connected to the fan gear and coupled to the second pump.

Any of the foregoing systems may also include a first pump gear directly connected to the first idler gear and to the first and a second pump gear coupled to the second idler gear and directly connected to the second pump.

Any of the foregoing systems may also include a reversing gear directly connected to the second idler gear and to the second pump gear.

In any of the foregoing systems, the first pump can include a first pump idler gear and a first driven gear directly connected to the first pump gear and to the first pump idler gear, the second pump can include a second pump idler gear and a second driven gear directly connected to the second pump gear and to the second pump idler gear.

In any of the foregoing systems, the first pump and the second pump each include at least one of a gerotor rotor pump, a rotary vane pump, a lobe pump, a circumferential piston pump, a screw pump, a radial plunger pump, a swashplate pump, a flexible member, an eccentric piston pump or a gear pump.

Any of the foregoing systems may also include a lubricant source. Any of the foregoing systems can also include a first check valve coupled between the first pump and the component and configured to allow a first flow of lubricant from the first pump to the component and to resist the first flow of lubricant from the component to the first pump. Any of the foregoing systems can also include a second check valve coupled between the second pump and the component and configured to allow a second flow of lubricant from the second pump to the component and to resist the second flow of lubricant from the component to the second pump.

In any of the foregoing systems, the first check valve and the second check valve can each include at least one of a ball check valve, a diaphragm check valve, a swing check valve, a stop-check valve or a duckbill valve.

Also described is a system for pumping lubricant to a component of a gas turbine engine. The system includes a fan gear coupled to a fan shaft of the gas turbine engine and configured to rotate in a forward direction and in a reverse direction. The system also includes an idler gear coupled to the fan gear. The system also includes a first pump coupled to the idler gear and configured to pump lubricant to the component in response to the fan rotating in the forward direction, and a second pump coupled to the idler gear and configured to pump lubricant to the component in response to the fan rotating in the reverse direction.

In the foregoing system, the idler gear can be directly connected to the fan gear.

Any of the foregoing systems can also include a first pump gear directly connected to the idler gear and to the first pump and a second pump gear directly connected to the idler gear and to the second pump.

In any of the foregoing systems, the first pump can include a first pump idler gear and a first driven gear directly connected to the first pump gear and to the first pump idler gear, and the second pump can include a second pump idler gear and a second driven gear directly connected to the second pump gear and to the second pump idler gear.

In any of the foregoing systems, the first pump and the second pump can each include at least one of a gerotor rotor pump, a rotary vane pump, a lobe pump, a circumferential piston pump, a screw pump, a radial plunger pump, a swashplate pump, a flexible member, an eccentric piston pump or a gear pump.

Any of the foregoing systems may also include a lubricant source. Any of the foregoing systems can also include a first check valve coupled between the first pump and the component and configured to allow a first flow of the lubricant from the first pump to the component and to resist the first flow of the lubricant from the component to the first pump. Any of the foregoing systems can also include a second check valve coupled between the second pump and the component and configured to allow a second flow of the lubricant from the second pump to the component and to resist the second flow of the lubricant from the component to the second pump.

In any of the foregoing systems, the first check valve and the second check valve can each include at least one of a ball check valve, a diaphragm check valve, a swing check valve, a stop-check valve or a duckbill valve.

Also described is a gas turbine engine. The gas turbine engine includes a fan section including a fan and a fan shaft, a component adapted to receive lubricant and a windmill assembly. The windmill assembly includes a fan gear coupled to a fan shaft of the gas turbine engine and configured to rotate in a forward direction and in a reverse direction. The windmill assembly also includes a first pump coupled to the fan gear and configured to pump lubricant to the component in response to the fan rotating in the forward direction. The windmill assembly also includes a second pump coupled to the fan gear and configured to pump lubricant to the component in response to the fan rotating in the reverse direction.

In the foregoing gas turbine engine, the windmill assembly can also include a first idler gear directly connected to the fan gear and coupled to the first pump and a second idler gear directly connected to the fan gear and coupled to the second pump.

In any of the foregoing gas turbine engines, the windmill assembly can also include a first pump gear directly connected to the first idler gear and to the first pump and a second pump gear coupled to the second idler gear and directly connected to the second pump.

In any of the foregoing gas turbine engines, the windmill assembly can also include a reversing gear directly connected to the second idler gear and to the second pump gear.

In any of the foregoing gas turbine engines, the windmill assembly can also include a first pump idler gear and a first driven gear directly connected to the first pump gear and to the first pump idler gear, and the second pump can include a second pump idler gear and a second driven gear directly connected to the second pump gear and to the second pump idler gear.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

FIG. 2 illustrates a windmill assembly coupled to a fan shaft of the gas turbine engine of claim 1 and operation of the windmill assembly in response to forward rotation of the fan shaft, in accordance with various embodiments;

FIG. 3 illustrates operation of the windmill assembly of FIG. 2 in response to reverse rotation of the fan shaft, in accordance with various embodiments;

FIG. 4 illustrates components of pumps of the windmill assembly of FIG. 2 and operation of the pumps in response to forward rotation of the fan shaft, in accordance with various embodiments;

FIG. 5 illustrates the components of the pumps of FIG. 4 and operation of the pumps in response to reverse rotation of the fan shaft, in accordance with various embodiments;

FIG. 6 illustrates an alternative windmill assembly for being coupled to a fan shaft and operation of the alternative windmill assembly in response to forward rotation of the fan shaft, in accordance with various embodiments;

FIG. 7 illustrates operation of the alternative windmill assembly of FIG. 6 in response to reverse rotation of the fan shaft, in accordance with various embodiments;

FIG. 8 illustrates components of pumps of the alternative windmill assembly of FIG. 6 and operation of the pumps in response to forward rotation of the fan shaft, in accordance with various embodiments; and FIG. 9 illustrates the components of the pumps of FIG. 8 and operation of the pumps in response to reverse rotation of the fan shaft, in accordance with various embodiments.

DETAILED DESCRIPTION

Figure 1:
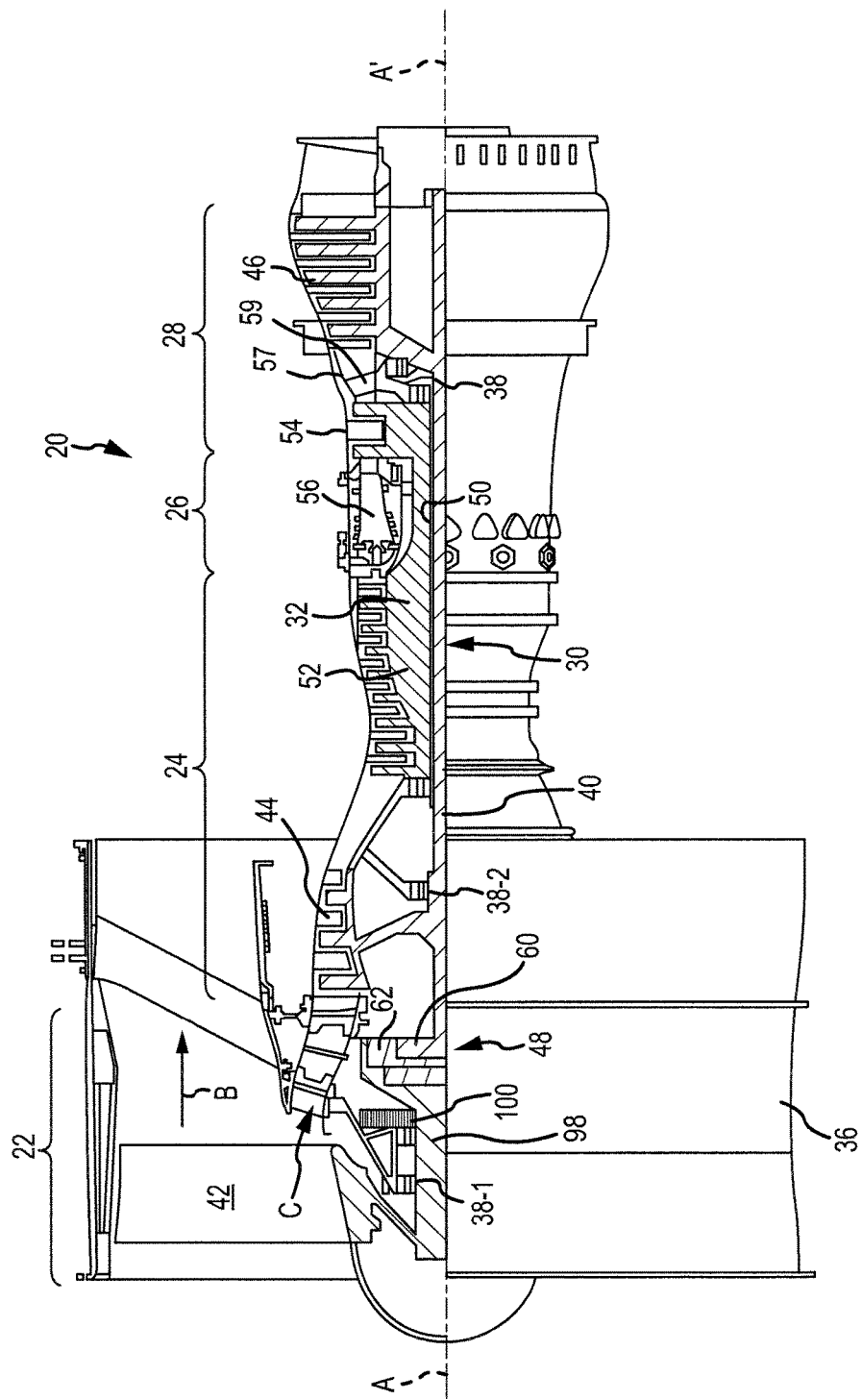
FIG. 1 is a cross-sectional view of an exemplary gas turbine engine, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction.

Gas turbine engine 20 may be a two-spool turbofan that generally incorporates a fan section 22, a compressor section 24, a combustor section 26 and a turbine section 28. Alternative engines include an augmentor section among other systems or features. In operation, fan section 22 drives air along a bypass flow-path B while compressor section 24 drives air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 generally includes an inner shaft 40 that interconnects a fan 42, a low pressure (or first) compressor section 44 and a low pressure (or first) turbine section 46. Inner shaft 40 is connected to fan 42 through a geared architecture 48 that can drive fan shaft 98, and thus fan 42, at a lower speed than low speed spool 30. Geared architecture 48 includes a gear assembly 60 enclosed within a gear housing 62. Gear assembly 60 couples inner shaft 40 to a rotating fan structure. Gear assembly 60 can include journal bearings which operate optimally when lubricated with a lubricant such as oil. A windmill assembly 100 can be coupled to fan shaft 98 and use power from fan 42 to pump lubricant to the journal bearings of gear assembly 60. Windmill assembly 100 can operate based on wind power when fan 42 is not receiving power from turbine section 28. Wind turns fan 42 as it blows past gas turbine engine 20. Fan 42 may rotate in a forward direction when gas turbine engine 20 is facing upwind and may rotate in a reverse direction when gas turbine engine 20 is facing downwind. Windmill assembly 100 can pump lubricant to gear assembly 60 when gas turbine engine 20 is facing upwind and when gas turbine engine 20 is facing downwind.

High speed spool 32 includes an outer shaft 50 that interconnects a high pressure (or second) compressor section 52 and high pressure (or second) turbine section 54. A combustor 56 is located between high pressure compressor 52 and high pressure turbine 54. A mid-turbine frame 57 of engine static structure 36 is located generally between high pressure turbine 54 and low pressure turbine 46. Mid-turbine frame 57 supports one or more bearing systems 38 in turbine section 28. Inner shaft 40 and outer shaft 50 are concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C is compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 is a high-bypass ratio geared aircraft engine. The bypass ratio of gas turbine engine 20 may be greater than about six (6). The bypass ratio of gas turbine engine 20 may also be greater than ten (10:1). Geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). The diameter of fan 42 may be significantly larger than that of the low pressure compressor section 44, and the low pressure turbine 46 may have a pressure ratio that is greater than about five (5:1). The pressure ratio of low pressure turbine 46 is measured prior to inlet of low pressure turbine 46 as related to the pressure at the outlet of low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

Referring now to FIGS. 1, 2 and 3, windmill assembly 100 can include a fan gear 200 coupled to fan shaft 98. Fan gear 200 can rotate in the same direction and along with fan 42 and thus fan shaft 98. In response to gas turbine engine 20 facing upstream (i.e., into the wind), fan gear 200 rotates in a forward direction as shown in FIG. 2. When gas turbine engine 20 is facing downstream, fan gear 200 may rotate in a reverse direction as shown in FIG. 3. Thus, the direction of rotation of fan gear 200 is at least partially based on a direction of wind relative to fan 42. The forward and reverse directions (whether clockwise or counterclockwise relative to an aft end of the gas turbine engine) are based on specifications of the particular gas turbine engine. Traditionally, the forward direction can correspond to a direction of fan rotation caused by turbine section 28 during operation of gas turbine engine 20.

Fan gear 200 may be coupled or directly connected to a first idler gear 202 and a second idler gear 204. First idler gear 202 may be coupled or directly connected to a first pump gear 210. Fan gear 200 is directly connected to first idler gear 202 when teeth or other components of fan gear 200 are in contact with teeth or other components of first idler gear 202, and fan gear 200 is coupled to first idler gear 202 when rotation of fan gear 200 results in rotation of first idler gear 202 even though they may not be directly connected. As first idler gear 202 rotates, it causes first pump gear 210 to rotate along with it. In response to first pump gear 210 rotating as shown in FIG. 2, a first pump 206 draws lubricant and pumps the lubricant towards gear assembly 60. A first check valve 216 is positioned between and coupled to first pump 206 and gear assembly 60. First check valve 216 allows lubricant to flow towards gear assembly 60 from first pump 206 and resists flow from gear assembly 60 towards first pump 206. Thus, in response to fan gear 200 rotating in the forward direction, lubricant is pumped by first pump 206 through first check valve 216 and towards gear assembly 60 where it may be used to lubricate the journal bearings of gear assembly 60.

Second idler gear 204 may be coupled or directly connected to a reversing gear 212. Reversing gear 212 may be coupled or directly connected to a second pump gear 214 that drives a second pump 208. As fan gear 200 rotates in the forward direction, second idler gear 204 rotates, thus causing reversing gear 212 and second pump gear 214 to rotate as shown in FIG. 2. As second pump gear 214 rotates, second pump 208 attempts to draw lubricant from gear assembly 60. Second pump 208 also attempts to draw lubricant from first pump 206 due to the connection between gear assembly 60 and first pump 206. However, a second check valve 218 is coupled between gear assembly 60 and second pump 208. Second check valve 218 allows lubricant to flow towards gear assembly 60 from second pump 208 and resists flow from gear assembly 60 to second pump 208. Accordingly, in response to fan gear 200 rotating in a forward direction, second pump 208 attempts to draw lubricant from gear assembly 60, while second check valve 218 resists flow in this direction.

In various embodiments, first check valve 216 and second check valve 218 can include any type of check valve including a ball check valve (as shown in FIG. 2), a diaphragm check valve, a swing check valve, a stop-check valve, a duckbill valve or the like. For example, first check valve 216 can include a spring 220 and a ball 222. As lubricant flows towards gear assembly 60, the pressure may exert a force on spring 220, thus compressing spring 220 and allowing the lubricant to flow past ball 222. As lubricant flows from second pump 208, sufficient compression force may not be exerted on spring 220 to compress spring 220. Thus, ball 222 may resist flow of lubricant from gear assembly 60 and second pump 208 towards first pump 206.

In various embodiments, first pump 206 and second pump 208 can include any pump operable with a gear. For example, first pump 206 and second pump 208 can include a gerotor rotor pump, a rotary vane pump, a lobe pump, a circumferential piston pump, a screw pump, a radial plunger pump, a swashplate pump, a flexible member, an eccentric piston pump and/or a gear pump. Operation of a gear pump will be described below with reference to FIGS. 4 and 5.

Referring now to FIG. 3, fan gear 200 is rotating in the reverse direction. In response, first idler gear 202 rotates, thus causing first pump gear 210 to rotate. This causes first pump 206 to attempt to draw lubricant from gear assembly 60. However, first check valve 216 resists lubricant flow from gear assembly 60 towards first pump 206. At the same time, fan gear 200 causes second idler gear 204 to rotate. Second idler gear 204 then causes reversing gear 212, and thus second pump gear 214, to rotate. In response to second pump gear 214 rotating as the fan gear 200 rotates in the reverse direction, second pump gear 214 causes second pump 208 to pump lubricant towards gear assembly 60. Second check valve 218 allows this flow from second pump 208 towards gear assembly 60.

With reference now to FIGS. 2 and 4, first pump 206 can include a first driven gear 412 that is coupled or directly connected to first pump gear 210. First driven gear 412 may be coupled or directly connected to a first pump idler gear 404 of first pump 206. As fan gear 200 rotates in the forward direction as shown in FIGS. 2 and 4, rotation of first driven gear 412 and first pump idler gear 404 may draw lubricant from a lubricant source 400 and pump the lubricant towards gear assembly 60. First check valve 216 allows this flow to occur.

Second pump 208 can include a second driven gear 410 that is coupled or directly connected to second pump gear 214. Second driven gear 410 may be coupled or directly connected to a second pump idler gear 402 of second pump 208. In response to forward rotation of fan gear 200, second driven gear 410 causes rotation of second pump idler gear 402. In response to rotation of second driven gear 410 and second pump idler gear 402 of second pump 208 while fan gear 200 rotates in the forward direction, second driven gear 410 and second pump idler gear 402 attempt to draw lubricant from gear assembly 60 and pump the lubricant towards lubricant source 400. Second check valve 218 resists this flow from gear assembly 60 towards second pump 208.

Turning now to FIGS. 3 and 5, fan gear 200 is rotating in the reverse direction. In response, first driven gear 412 causes rotation of first pump idler gear 404. Due to the direction of rotation of first driven gear 412 and first pump idler gear 404, first pump 206 attempts to draw lubricant from gear assembly 60 and to pump the lubricant towards lubricant source 400. However, first check valve 216 resists this flow of lubricant.

At the same time, second driven gear 410 causes rotation of second pump idler gear 402. Due to the direction of rotation of second driven gear 410 and second pump idler gear 402, second pump 208 draws lubricant from lubricant source 400 and pumps the lubricant towards gear assembly 60. Second check valve 218 allows this flow to occur.

Referring now to FIG. 6, an alternative windmill assembly 700 includes a fan gear 600 coupled or directly connected to an idler gear 602. Idler gear 602 is coupled or directly connected to a first pump gear 610 and a second pump gear 608. First pump gear 610 is coupled or directly connected to a first pump 606 which may operate in a similar manner as first pump 206 of FIG. 2. Second pump gear 608 is coupled or directly connected to a second pump 604 that operates in a similar manner as first pump 606. First pump gear 610 is coupled to idler gear 602 at a different location than second pump gear 608.

In response to forward rotation of fan gear 600, as shown in FIG. 6, idler gear 602 rotates, thus causing rotation of first pump gear 610 and second pump gear 608. As first pump gear 610 rotates, first pump 606 pumps lubricant towards a gear assembly 660 that is similar to gear assembly 60 of FIG. 1. At the same time, second pump 604 attempts to draw lubricant from gear assembly 60 towards second pump 604. A second check valve 612 resists flow of lubricant from gear assembly 60 towards second pump 604, while a first check valve 614 allows flow from first pump 606 towards gear assembly 60. First check valve 614 and second check valve 612 operate in a similar manner as first check valve 216 and second check valve 218 of FIG. 2.

Referring now to FIG. 7, fan gear 600 is rotating in the reverse direction. The reverse rotation of fan gear 600 causes idler gear 602 to rotate in the opposite direction than it rotated in FIG. 6. As a result, first pump gear 610 and second pump gear 608 rotate as shown in FIG. 7. In response, second pump 604 pumps lubricant through second check valve 612 towards gear assembly 660. First pump 606 attempts to draw lubricant from gear assembly 660; however, first check valve 614 resists the flow of lubricant.

Referring now to FIGS. 6 and 8, first pump 606 may include a first driven gear 810 that is coupled or directly connected to first pump gear 610. First driven gear 810 is coupled or directly connected to a first pump idler gear 804. In response to fan gear 600 rotating in the forward direction, first driven gear 810 and first pump idler gear 804 rotate, thus drawing lubricant from lubricant source 800 and pumping the lubricant towards gear assembly 660.

At the same time, forward rotation of fan gear 600 causes rotation of a second driven gear 808 and a second pump idler gear 802. This rotation of second driven gear 808 and second pump idler gear 802 attempts to draw lubricant from lubricant source 800. However, second check valve 612 resists this flow of lubricant.

Referring now to FIGS. 7 and 9, fan gear 600 is rotating in the reverse direction. As a result, second driven gear 808 and second pump idler gear 802 rotate in the opposite direction relative to FIG. 8. As a result, second pump 604 draws lubricant from lubricant source 800 and pumps the lubricant to gear assembly 660. At the same time, first driven gear 810 and first pump idler gear 804 rotate, thus attempting to draw lubricant from gear assembly 660; however, first check valve 614 resists this flow of lubricant.

Although the present disclosure is directed to pumping lubricant to a gear system of a gas turbine engine, one skilled in the art will realize that a windmill assembly can also or instead be used to pump lubricant to any other component of gas turbine engine.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for pumping lubricant to a component of a gas turbine engine, comprising:
    a fan gear coupled to a fan shaft of the gas turbine engine and configured to rotate in a forward direction and in a reverse direction;
    a first pump coupled to the fan gear and configured to pump lubricant to the component in response to a fan rotating in the forward direction; and
    a second pump coupled to the fan gear and configured to pump lubricant to the component in response to the fan rotating in the reverse direction.

2. The system of claim 1, further comprising:
    a first idler gear directly connected to the fan gear and coupled to the first pump; and
    a second idler gear directly connected to the fan gear and coupled to the second pump.

3. The system of claim 2, further comprising:
    a first pump gear directly connected to the first idler gear and to the first pump; and
    a second pump gear coupled to the second idler gear and directly connected to the second pump.

4. The system of claim 3, further comprising a reversing gear directly connected to the second idler gear and to the second pump gear.

5. The system of claim 4, wherein the first pump includes a first pump idler gear and a first driven gear directly connected to the first pump gear and to the first pump idler gear, and wherein the second pump includes a second pump idler gear and a second driven gear directly connected to the second pump gear and to the second pump idler gear.

6. The system of claim 1, wherein the first pump and the second pump each include at least one of a gerotor rotor pump, a rotary vane pump, a lobe pump, a circumferential piston pump, a screw pump, a radial plunger pump, a swashplate pump, a flexible member, an eccentric piston pump or a gear pump.

7. The system of claim 1, further comprising:
    a lubricant source;
    a first check valve coupled between the first pump and the component and configured to allow a flow of lubricant from the first pump to the component and to resist the flow of lubricant from the component to the first pump; and
    a second check valve coupled between the second pump and the component and configured to allow a second flow of lubricant from the second pump to the component and to resist the second flow of lubricant from the second pump to the component.

8. The system of claim 7, wherein the first check valve and the second check valve each include at least one of a ball check valve, a diaphragm check valve, a swing check valve, a stop-check valve or a duckbill valve.

9. A system for pumping lubricant to a component of a gas turbine engine, comprising:
    a fan gear coupled to a fan shaft of the gas turbine engine and configured to rotate in a forward direction and in a reverse direction;
    an idler gear coupled to the fan gear;
    a first pump coupled to the idler gear and configured to pump lubricant to the component in response to a fan rotating in the forward direction; and
    a second pump coupled to the idler gear and configured to pump lubricant to the component in response to the fan rotating in the reverse direction.

10. The system of claim 9, wherein the idler gear is directly connected to the fan gear.

11. The system of claim 10, further comprising:
    a first pump gear directly connected to the idler gear and to the first pump; and
    a second pump gear directly connected to the idler gear and to the second pump.

12. The system of claim 11, wherein the first pump includes a first pump idler gear and a first driven gear directly connected to the first pump gear and to the first pump idler gear, and wherein the second pump includes a second pump idler gear and a second driven gear directly connected to the second pump gear and to the second pump idler gear.

13. The system of claim 9, wherein the first pump and the second pump each include at least one of a gerotor rotor pump, a rotary vane pump or a gear pump.

14. The system of claim 9, further comprising:
    a lubricant source;
    a first check valve coupled between the first pump and the component and configured to allow a first flow of the lubricant from the first pump to the component and to resist the first flow of the lubricant from the component to the first pump; and a second check valve coupled between the second pump and the component and configured to allow a second flow of the lubricant from the second pump to the component and to resist the second flow of the lubricant from the second pump to the component.

15. The system of claim 14, wherein the first check valve and the second check valve each include at least one of a ball check valve, a diaphragm check valve, a swing check valve, a stop-check valve or a duckbill valve.

16. A gas turbine engine, comprising:
a fan section including a fan and a fan shaft;
a component adapted to receive lubricant; and
a windmill assembly including:
  a fan gear coupled to the fan shaft of the gas turbine engine and configured to rotate in a forward direction and in a reverse direction,
  a first pump coupled to the fan gear and configured to pump lubricant to the component in response to the fan rotating in the forward direction, and
  a second pump coupled to the fan gear and configured to pump lubricant to the component in response to the fan rotating in the reverse direction.

17. The gas turbine engine of claim 16, wherein the windmill assembly further includes:
  a first idler gear directly connected to the fan gear and coupled to the first pump; and
  a second idler gear directly connected to the fan gear and coupled to the second pump.

18. The gas turbine engine of claim 17, wherein the windmill assembly further includes:
  a first pump gear directly connected to the first idler gear and to the first pump; and
  a second pump gear coupled to the second idler gear and directly connected to the second pump.

19. The gas turbine engine of claim 18, wherein the windmill assembly further includes a reversing gear directly connected to the second idler gear and to the second pump gear.

20. The gas turbine engine of claim 19, wherein the windmill assembly further includes a first pump idler gear and a first driven gear directly connected to the first pump gear and to the first pump idler gear, and wherein the second pump includes a second pump idler gear and a second driven gear directly connected to the second pump gear and to the second pump idler gear.

* * * * *